Feb. 13, 1968  J. P. FIORE ETAL  3,369,201
COLOR CATHODE RAY TUBE CONVERGENCE AND DEFLECTION
TESTING ASSEMBLY AND FIXTURE THEREFOR
Filed Aug. 27, 1964  4 Sheets-Sheet 1
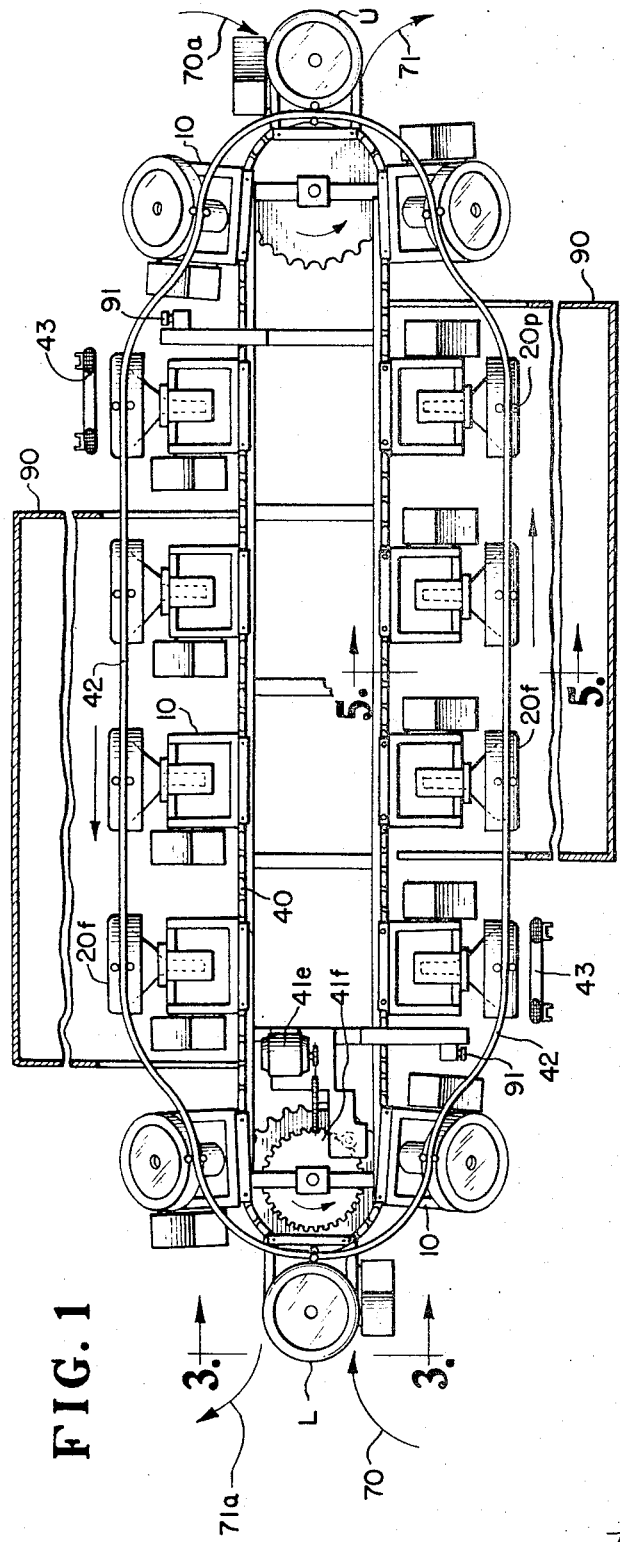
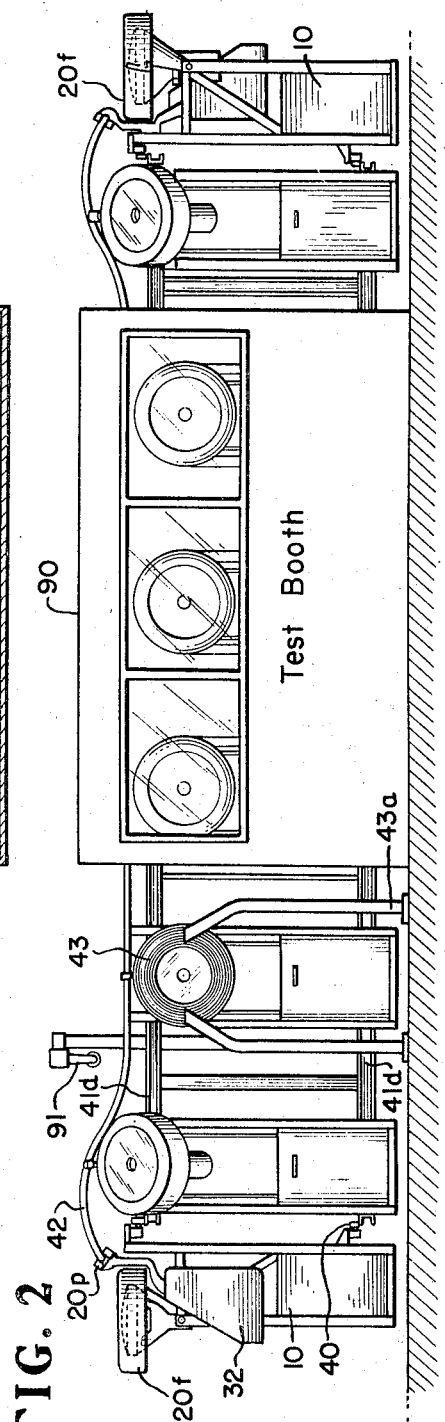
INVENTORS
Joseph P. Fiore
Raymond J. Pekosh
By Francis W. Crotty
Atty.

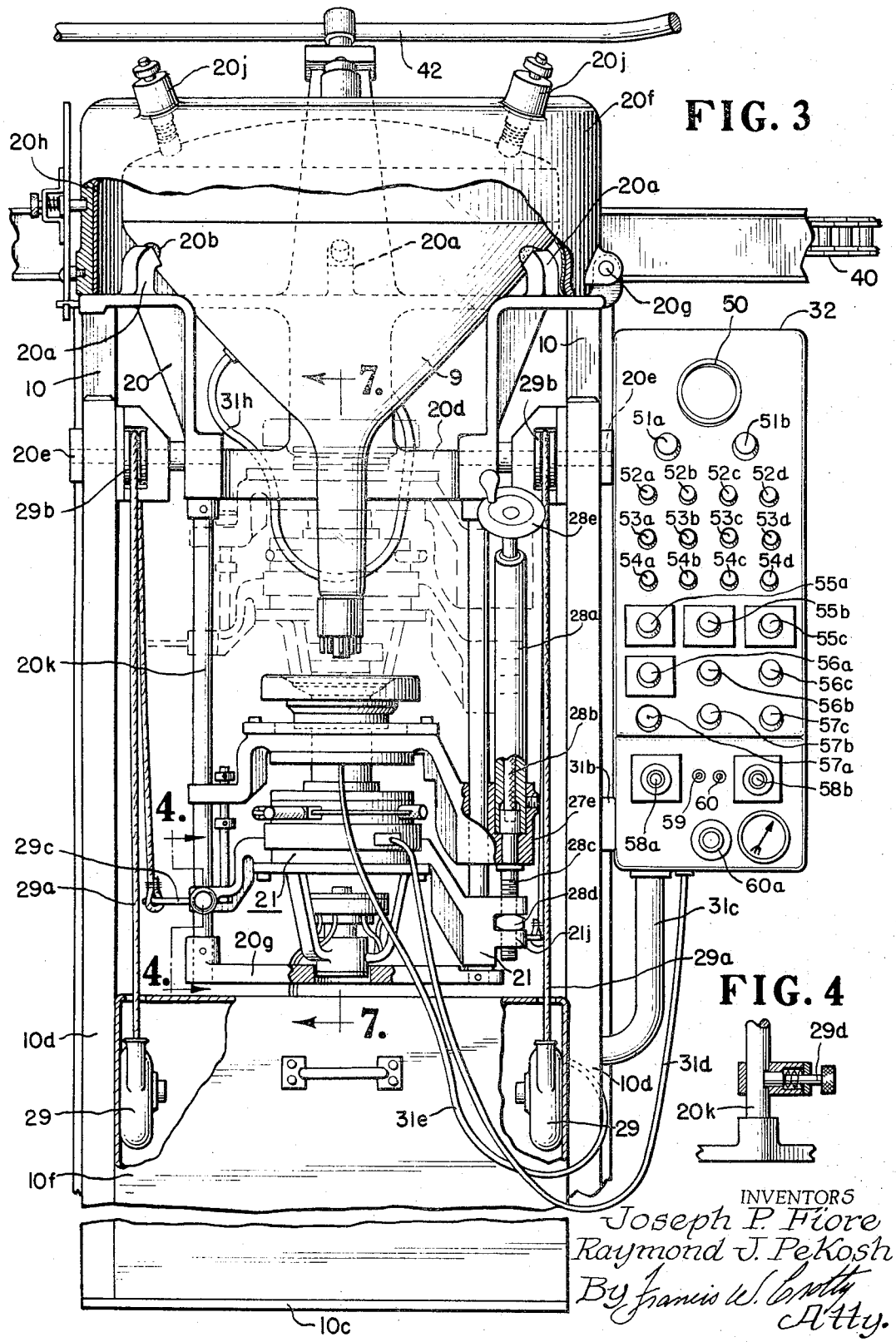

INVENTORS
Joseph P. Fiore
Raymond J. PeKosh
By Francis W. Crotty
Atty.

Feb. 13, 1968 — J. P. FIORE ET AL — 3,369,201
COLOR CATHODE RAY TUBE CONVERGENCE AND DEFLECTION
TESTING ASSEMBLY AND FIXTURE THEREFOR

Filed Aug. 27, 1964 — 4 Sheets-Sheet 4

INVENTORS
Joseph P. Fiore
Raymond J. Pekosh
By Francis W. Crotty
Atty.

United States Patent Office 3,369,201
Patented Feb. 13, 1968

3,369,201
COLOR CATHODE RAY TUBE CONVERGENCE
AND DEFLECTION TESTING ASSEMBLY AND
FIXTURE THEREFOR
Joseph P. Fiore, Wheeling, and Raymond J. Pekosh, Chicago, Ill., assignors to The Rauland Corporation, Chicago, Ill., a corporation of Illinois
Filed Aug. 27, 1964, Ser. No. 392,511
11 Claims. (Cl. 324—20)

ABSTRACT OF THE DISCLOSURE

A test arrangement for color picture tubes comprises a conveyor for moving test carts from loading to testing and to unloading stations. Each cart has a workholder which receives a tube with its axis disposed vertically but the workholder pivots to present the tube in a horizontal position at the testing station. The tube is tested in an environment simulating its operation in a receiver. A degaussing coil degausses the tube. A carriage slidably supported on a workholder accommodates a deflection yoke, a convergence assembly and an electrical socket which are moved into the appropriate functional positions with respect to the tube installed in the workholder. Signal generators carried by the cart energize the yoke and convergence assemblies for testing purposes.

---

This invention is directed to an arrangement for conducting the final tests of a tri-color cathode-ray tube. The inventive concepts lend themselves to the final testing of a variety of tri-color tubes but are especially applicable to the so-called shadow-mask tube and will be described in that connection.

The manufacture of such a color tube is a very complex process and success in fabrication can be measured only upon the completion of the many fabricating steps and through a fairly extensive testing program. It is necessary, for example, to examine the several color fields of the tube individually to make a final evaluation of the screening process and it is also essential that the cooperative relation of the several guns of the tube be measured which requires testing such operations as deflection and convergence. It is further desirable to examine brightness characteristics and to measure light output.

The art is well informed as to the test equipment and techniques to be employed in making such tests of a tri-color tube but is in need of an arrangement through which such test gear may be used to make the necessary final tests of the tube in the shortest possible time and with a minimum of personnel and handling of the tube. The arrangement or final test machine to be described fulfills this need.

It is, therefore, an object of the invention to provide a novel and improved arrangement for conducting the final tests for a color cathode-ray tube.

It is another specific object of the invention to provide an arrangement by which final testing of a color cathode-ray tube may be accomplished quickly and with a minimum of personnel.

Another and particular object of the invention is to provide a test cart of novel and improved construction for conducting a color cathode-ray tube through a sequence of testing stations.

A test cart, constructed in accordance with the invention, for accommodating a color cathode-ray tube to undergo final test comprises a workholder for supporting the tube under test in a predetermined position along a reference axis. There is an indexing device on the cart which cooperates with an index formed integrally with the tube envelope to establish the tube under test in a preselected rotational relation in respect to the reference axis. There are electrical connectors on the cart for applying operating potentials to the electrode system of the tube under test and there are both a convergence assembly and a deflection yoke assembly displaceable to encompass the neck portion of the tube with the yoke located on the screen side of the convergence assembly. The cart has means for applying to the tube under test the necessary convergence and deflection signals and provisions for adjusting the amplitude of these signals. Finally, there are means on the cart for positionally adjusting the yoke assembly relative to the convergence assembly along the aforesaid reference axis.

The final test arrangement, in accordance with the invention, comprises a conveyor for transporting tubes under test from a loading station, through a testing station to an unloading station. Test carts as described in the preceding paragraph are coupled to the conveyor to travel therewith and provide the means for mechanically establishing the tube in the necessary test positions. These carts also serve to energize the electrode systems of the tubes under test and apply signals, controllable in amplitude, necessary for conducting the various tests of the tube.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a plan view of a color cathode-ray tube final test arrangement constructed in accordance with the invention;

FIGURE 2 is a side elevational view of the apparatus of FIGURE 1;

FIGURE 3 is a view of the loading-unloading station of the arrangement and is taken as indicated along section line 3—3 of FIGURE 1;

FIGURE 4 illustrates a detail of a locking provision of the test cart of FIGURE 3;

Before discussing structural details and the operation of the final test arrangement, it is appropriate to consider the nature of the tube to be tested and requirements imposed on the testing arrangement to accommodate the operational tests of the tube. The tube will be assumed to be of the shadow-mask variety having an envelope with a neck portion terminating in the usual base with terminal pins connected to the electrode system of the tube, a screen portion and a funnel-shaped intermediate portion. Also, an index provision is cast on the outer periphery of the envelope and the electrode system enclosed within that envelope comprises three electron guns in a delta or triangular array at the base of the tube. The tube is of the electrostatically focused type and is intended to employ a common deflection yoke for subjecting all three electron beams to common deflection fields. To achieve appropriate registration of the several beams with the phosphor dots at all points in the scanned raster, the tube is expected to function in conjunction with a convergence assembly having dynamic and, if desired, static convergence fields for each of the three beams, separately adjustable to perfect convergence. There is the usual blue lateral magnet in the convergence assembly employed for more complete registry of the three beams. The use of such assemblies requires that the tube, in final test, be established in the position and operational environment that it will have when properly installed within a color receiver. If these requirements are to be satisfied, it is essential that the final test equipment be arranged to establish conveniently and quickly both the positional and rotational aspects to simulate the association of the tube within an operating receiver. These requirements are met in the test cart of the invention by means of which a tube under test is transported through the testing stations.

Figure 5:
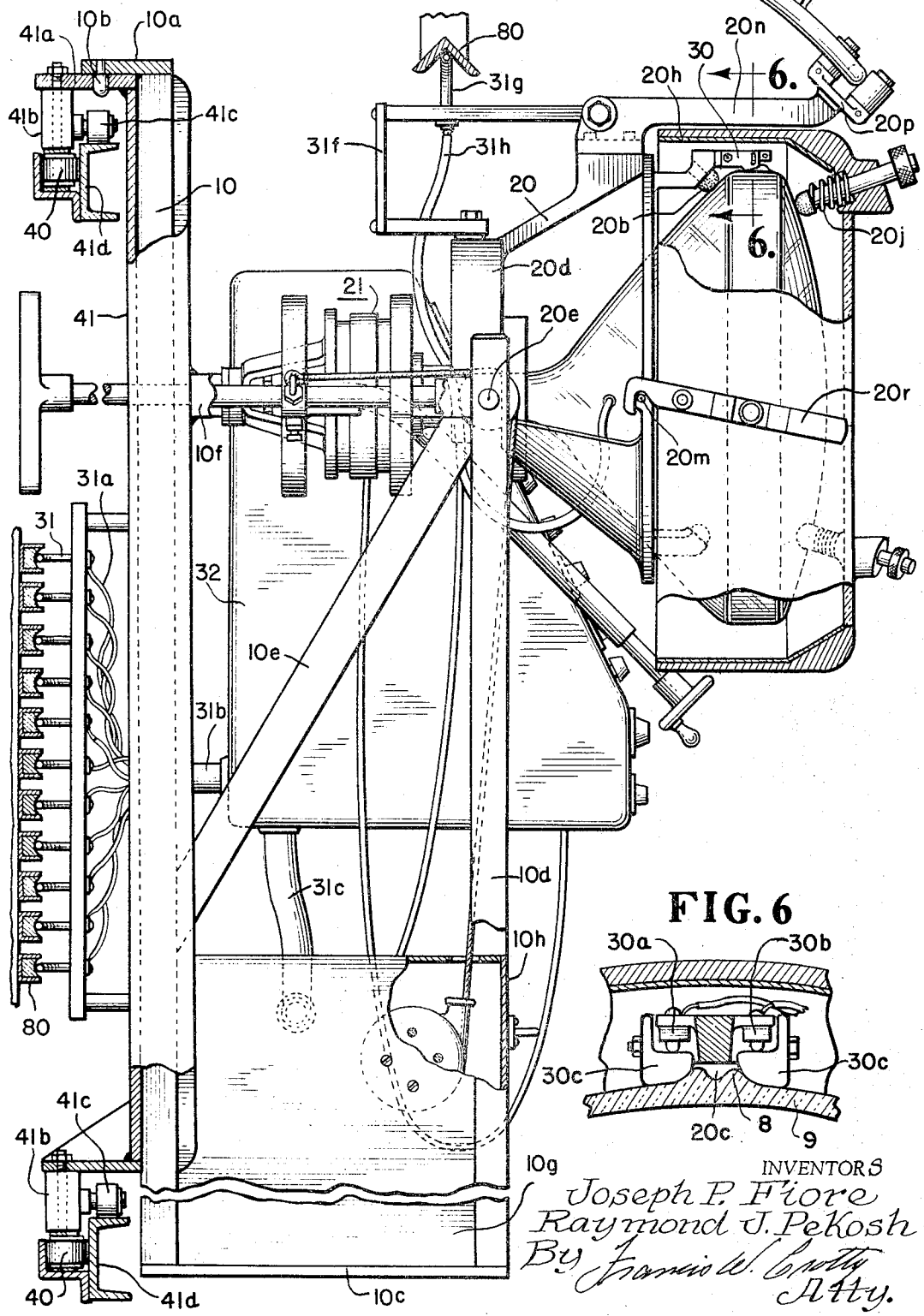
FIGURE 5 is a view taken as indicated by section line 5—5 in FIGURE 1, illustrating a particular position of the tube as it travels through the testing stations.

The structure of the test cart is shown in FIGURES 3 and 5. It has a principal support formed of a pair of vertically extending structural members or hollow columns 10 of rectangular cross section which are closed at their upper end by a plate 10a carrying a pair of downwardly extending pins 10b only one of which appears in FIGURE 5. At their lower extremity support members 10 are affixed to a base 10c from which extend a second and similar pair of columnar structural members 10d.

As shown in FIGURE 5 a diagonal brace 10e extends between the upper end of each member 10d and structural member 10. Further mechanical rigidity is provided by a horizontal brace 10f likewise extending from the top portion of each structural member 10d to the companion structure 10.

There is an enclosure 10g constructed at the lower portion of the cart having an access door 10h in the front. Necessary circuitry is enclosed within chamber 10g as explained hereafter. The cart, above chamber 10g, is essentially an open rectangular framework to which is pivotally mounted a workholder 20 for supporting the tube 9 under test, supporting that tube in a predetermined position along and in a predetermined rotational relation with respect to a reference axis. That axis simulates the axis of the tube when it is properly in position in a color receiver. The workholder is a casting which may best be described as a discontinuous cylinder, being opened at the front to facilitate loading tube 9 into the holder.

Figure 6:
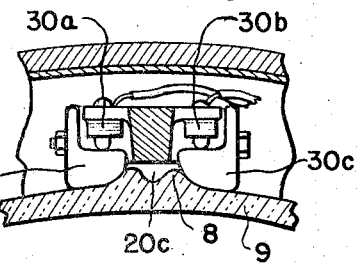
FIGURE 6 illustrates the detail of an indicating mechanism employed for obtaining proper orientation of the tube under test about a reference axis.

At its upper free end, the workholder has three supports 20a having an angular separation of 120° and terminating in buffers 20b for engaging the funnel of the tube envelope. These supports position the tube vertically with its axis coincident with the reference axis of the cart and with the tube in a predetermined position along that axis as determined by the support elements. In order that the accessory equipment, especially the convergence magnets, may be properly positioned relative to the electrode system of the tube under test, it is necessary to adjust the tube not only along the axis of the cart but also in a particular rotational relation. To that end, one of supports 20 carries an indicator to be actuated by the index provision of the tube envelope whenever the rotational relation of the tube under test is slightly different from its desired predetermined relation. Obviously, the operator loading the tube into the test cart is able, through inspection, to have the index of the tube envelope substantially aligned with a companion index on the workholder and an indication is given if their alignment is not precise. FIGURE 6 shows a saddle-type index projection 8 on the periphery of tube 9 and a complementary shaped index 20c of an indicator arrangement 30 which extends from one of supports 20a as illustrated in FIGURE 5. The indicator has a pair of microswitches 30a and 30b, each of which is associated with a pivoted operator 30c. When the tube under test has assumed its desired orientation about the reference axis of the cart, the relationship of FIGURE 6 is established. In this condition, neither switch operator 30c is displaced and neither microswitch 30a, 30b is actuated. Accordingly, indicator lamps (not shown) associated with the microswitches are deenergized.

If the tube were misadjusted, being displaced slightly in a clockwise direction as viewed in FIGURE 6, actuator 30c would be displaced to close microswitch 30b and energize the appropriate indicator lamp. Misadjustment in the other direction results in actuation of microswitch 30a to operate another signal lamp.

It has been mentioned that workholder 20 is pivotally mounted to the cart. This is accomplished by providing at the end of workholder 20, opposite supports 20a, an essentially semicircular member 20d which has a bushing at each free end. Shafts 20e enter these bushings and also extend through structural members 10d. If necessary, additional bearing supports may be constructed in the form of bearing blocks secured to structural members 10d at the positions of shafts 20e.

A cap 20f is movably secured to the workholder to close over the screen portion of the tube under test and lock the tube in its predetermined position. More particularly, the cap has the form of a cylindrical shell pivoted at 20g to workholder 20. The cap has a centrally located aperture in the portion thereof facing the screen section of the tube under test in order to expose the screen for observation. The flange of the cap extends in the direction of the tube axis and the reference axis of the cart and is provided with a linear 20h to serve as a magnetic shield. The cap may be formed of aluminum and its liner of annealed, cold rolled steel. Preferably, the liner is dead annealed after its fabrication has been completed. As shown more clearly in FIGURE 5, the shield extends along the flange of the cap but terminates short of the window through which the screen is exposed. The configuration and shielding effect of this shield, determined principally by its dimensions, thickness and material, establishes for the tube under test a magnetic field environment which simulates that of a tube operating within a receiver. This is determined empirically for the final test arrangement taking into consideration the field environment of the test gear and also striking a compromise between the fields experienced within a wooden receiver cabinet on the one hand and a metallic cabinet on the other.

Near the dome of the cap and displaced from one another by 120° are three spring pressed clamps or buttons 20j serving to apply a positive but light clamping pressure against the tube under test. A latch 20r is pivotally mounted to the periphery of the cap and may engage a lock 20m on workholder 20 to lock the cap into position once it has been closed over the tube under test.

An arm 20n (FIGURE 5) projects from workholder 20 to carry a bifurcated member 20p upon the tines of which there are a pair of cam following rollers. The function of these rollers will be made clear hereafter.

In order to conduct the necessary final tests of a color tube supported within workholder 20, it is essential that its electrode system be energized and that the tube be provided with controllable deflection, convergence and purity fields. At the same time, it is desirable that the accessory gear for energizing the tube and for creating these fields be out of the way during the loading of the tube within the workholder. Accordingly, the cart has movable a carriage 21, details of which appear in FIGURES 7 and 8. The carriage supports an electrical socket for engaging the terminal pins at the base of the tube, a purity coil, a convergence assembly and a yoke assembly arranged in the recited order and considered individually hereafter. The carriage has a principal member 21a in the form of a cylindrical casting of non magnetic material and it carries, by means of machine screws or the like, a terminal portion which has a basket-type section 21b for housing an electrical socket 22 and a flat or flanged portion 21c to accommodate the mounting screws. Interposed between members 21a and 21b and secured therewith in a subassembly is a ring member 21d which has a pair of projecting arms 21e and 21f. The first of these has a bushing-type termination 21g through which extends a guide rod 20k which is secured to and depends from base portion 20d of workholder 20. Actually, there are two such rods extending in parallel relation on opposite sides of the workholder and interconnected at their free ends by a cross piece 20q which has a central aperture dimensioned to receive the extreme termination of basket portion 20b when carriage 21 is in a loading position illustrated in FIGURE 3. Companion arm 21f is similarly provided with a bushing section 21h through which guide rod 20k extends. Horizontally extending projections 21j of bushing section 21h are apertured to accommodate a threaded shaft to be considered more particularly hereafter and the separation of these projections entrap a machine nut also to be considered subsequently.

At the remote end of basket 21b there is secured a socket assembly having a base 22a which has on its upper surface an annular series of flexible contact fingers 22b. Base 22a is formed of insulating material and the contact strips are separated and insulated from one another. Rivets or other mechanical connectors provide convenient means for connecting leads 22c to the various contacts of the socket assembly. In addition to annular base 22a, the socket has a member 22d mechanically coupled to base 22a and having a cutout to serve as a key-way for accepting the locking key conventionally carried on the tube base for the purpose of properly correlating the several contact strips 22b with the terminal pins of the tube. This assembly of members 22a and 22d is rotatably supported from a cylindrical member 22e. It is desirable to have some rotational freedom of base 22a to permit the operator to make certain of electrical connections between the tube pins and the contact strips of the socket. The cylinder 22e is secured to a re-entrant portion 21k of basket 21b by means of a pin 22f which is received in a longitudinally extending cutaway or slot of the re-entrant section. Springs 22g are received in wells or apertures of re-entrant section 21k and are affixed to a closure plate 22h of cylinder 22e to exert an axial pressure on the socket assembly. As viewed in FIGURE 7, the pressure is directed vertically upward and assures firm contact between terminal strips 22b and the base of a tube received within socket 22.

The next electrical accessory accommodated by carriage 21, viewing this structure from base 21b in the direction of the screen of tube 9, is a purity coil 23 which is carried by a mounting plate 23a received in a shoulder formed in the upper surface of carriage member 21a.

A convergence assembly 24 is positioned above the purity coil and, from the standpoint of its electrical structure and function, is essentially the same as that which is characteristically employed with three-gun shadow-mask tubes in color receivers. Its principal components are revealed in FIGURE 8 and they include a plurality, specifically three, generally similar convergence magnet assemblies 24a. Each has an electromagnet with pairs of coils arranged on a U-shaped magnetic structure terminating in pole pieces. The drawing shows a pair of coils in alignment on each leg of the magnetic structure. Generally, the inner coil which is closer to the axis of tube 9 is energized by convergence signals at the horizontal scanning frequency and the other coil is energized by convergence signals at the vertical frequency. For the test arrangement under consideration, it is also desirable to supply each convergence magnet with a controllable amount of direct current which may be put into either of these coils or there may be a third coil on each leg of the magnet structure to be D.C. energized.

Figure 7:
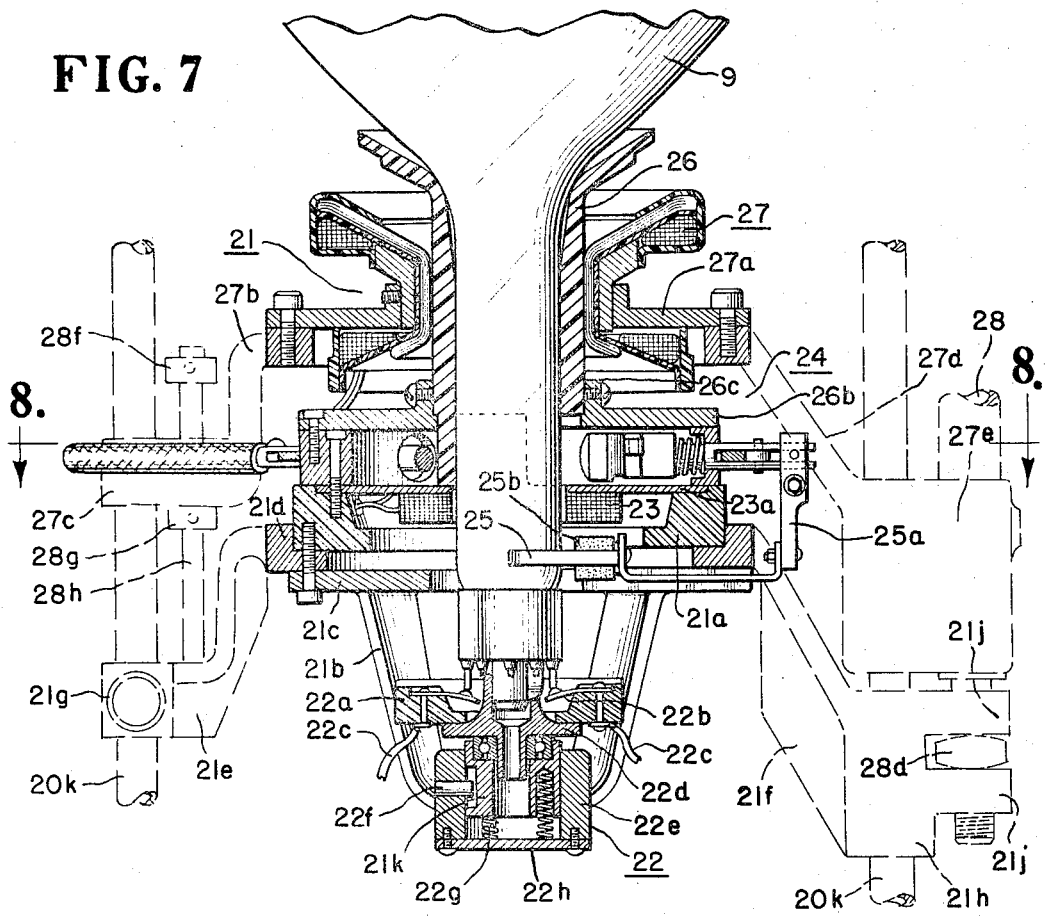
FIGURE 7 is a cross-sectional view taken as indicated by section line 7—7 of FIGURE 3.
Figure 8:
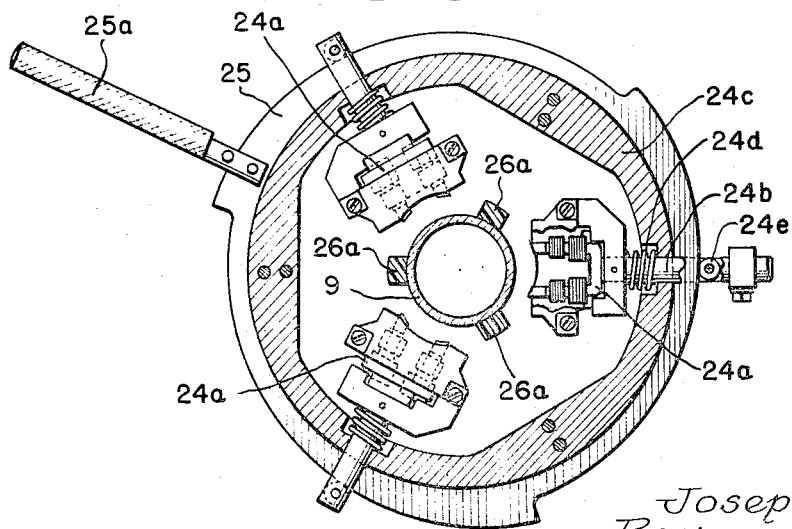
FIGURE 8 is another sectional view taken along section line 8—8 of FIGURE 7.

Obviously, it is most desirable that each of the magnet structures be brought as close to the tube neck as possible to improve the efficiency or sensitivity of the convergence system. Were the magnets stationary, this would make it difficult to load the tube under test into the workholder. Accordingly, the magnets are movable radially from a loading position in which they are spaced from the neck portion of the tube under test as shown in FIGURE 8 to an alternative or testing position in which the magnets are closely adjacent to the neck portion of the tube, preferably bearing thereagainst. More particularly, each magnet assembly is mechanically secured to the free end of a radially extending member 24b which is supported and maintained in position by a cylindrical or ring member 24c which has three radially extending apertures, spaced 120° apart and dimensioned to receive one of members 24b. The ring 24c has three seats or recesses each of which receives a compression spring 24d, the spring bearing against the ring at one end and against the structure of a convergence magnet 24a at the other and biasing the magnet assembly radially inward. Each member 24b carries, at the end which extends beyond ring 24c, a cam follower or roller 24e and a cam assembly having three similar sections 25 is mounted concentrically of ring 24c for cooperating with rollers 24e. The contour of each cam sector is such that when its minimum dimension, measured from the axis of tube 9, is presented to follower 24e, spring 24d is permitted to drive the convergence assembly radially inward to position the pole pieces against the neck of the tube. Consequently, the cam assembly and followers constitute means for displacing the magnet assemblies between the loading position of FIGURE 8 and the active or testing position. Necessarily, cam 25 is rotatable relative to ring 24c so that manipulation of a handle 25a facilitates displacement of the convergence magnets. A convenient way of mounting the cam is to provide the portions of members 24b which extend beyond ring 24c with a slot or bifurcation which may accommodate cam ring 25. In assembling the arrangement, members 24d are threaded radially outwardly from within cam ring 24c. When the members 24b have been thus positioned, engaging and rotatably holding cam 25, each follower 24e may be placed in position by a pin extending through the bifurcation of its member 24b. This assembly of convergence ring 24c with cam 25 and the convergence magnets is secured to carriage member 21a by machine bolts as indicated in FIGURE 7. Of course, the described structure prevents rotation of the convergence coils.

It is frequently the practice to associate a blue lateral magnet with the electron gun of the tube under test that is associated with the blue phosphor of the screen and such a magnet is also included in the arrangement, being positioned between convergence magnets 24 and socket 22. The blue lateral magnet 25 is secured by means of a linkage 25a to one of the convergence magnets 24a to be movable therewith between a loading and a testing position. This coupling is clearly indicated in FIGURE 7. It is desirable to accurately position the blue lateral magnet with respect to the blue gun and for that purpose a U-shaped guide 25b is secured to the mount of the blue lateral magnet to engage the neck of the tube under test and position the magnet.

Mounted concentrically with and extending above the convergence magnet assembly is a cylindrical stop device or gauge 26 of insulating material which, in a manner to be made clear hereafter, determines the location of the testing position of carriage 21. The vertical end of the gauge is flared to engage the funnel portion of the tube under test so that the engagement of these components may determine a limit position of carriage 21. At the opposite end the gauge has cutaway areas in alignment with the several convergence assemblies as shown in FIGURE 8. Accordingly, in the plane of these magnets the gauge appears to have three radial sections 26a of small arcuate length. This permits the gauge to be positioned by plate 23a on the one hand and yet allow the convergence magnets to contact the neck of the tube under test when they have been advanced to the test position. Gauge 26 is integrated with the carriage assembly by means of a plate 26b having a centrally located hub section 26c which accommodates screws that may be driven home against gauge 26. Plate 26b, in turn, is supported by machine screws from ring 26c.

Forwardly of convergence assembly 24 there is a yoke assembly 27 which electrically and mechanically is of conventional construction. It includes the usual horizontal and vertical, or line and field, deflection windings for displacing the three beams of the tube under test concurrently in order to scan the screen in a raster of a repeating series of horizontal lines. The yoke assembly is movable relative to carriage 21 along the axis of that carriage which serves as a reference axis for the test equipment. To that end, the yoke is mechanically secured to an apertured plate 27a which has an L-shaped guide 27b extending from one side with a bushing section 27c through which guide rod 20k extends. At the opposite side of mounting plate 27a there is a similar member 27d with an enlarged bushing section 27e that not only accommodates the remaining guide rod 27k but also a shaft arrangement 28 provided to accomplish longitudinal displacement of the yoke along the reference axis of the test gear and relative to carriage 21.

As illustrated in FIGURE 3, a tube 28a is received within an aperture provided in bushing 27e. It may also be mechanically supported by braces (not shown) from the yoke support casting. Within tube 28a there is a flexible shaft 28b which has a rectangular termination received by an aperture of similar configuration provided in the uppermost or free end of a threaded shaft 28c. This shaft threads through a nut 28d that is captured and restrained against longitudinal movement by projections 21j of carriage assembly 21. At its opposite end shaft 28b terminates in a hand crank 28e by means of which the shaft may be rotated to displace yoke 27 along the reference axis of the test gear but within limits defined by a pair of adjustable stop elements 28f and 28g (FIGURE 7). These elements are mounted in adjustably fixed positions on a rod 28h extending from arm 21e of carriage 21.

From the foregoing description and particularly the illustration of FIGURE 7, it is apparent that the electrical socket 22, purity coil 23, convergence assembly 24 and yoke 27 are mounted on carriage 21 in coaxial relation to the reference axis of the test gear. The carriage with these parts is slidable along guide rods 20k between a loading position shown in full-construction line in FIGURE 3 to a testing position shown in phantom or broken-construction line in the same figure. When the carriage is in its loading position, the assemblies mounted thereon are clear of the tube under test. In other words, the tube may be loaded within workholder 20 without any interference on the part of the various assemblies secured to carriage 21. And yet, with the carriage in its testing position the purity coil 23, the convergence assembly 24 and yoke assembly 27 encompass the neck portion of the tube under test as required to control the electron beams of that tube. At the same time, socket 22 completes circuit connections to the terminal pins of that tube. Movement of carriage 21 between the loading and testing stations is facilitated by a pair of cable and reel arrangements, located at opposite sides of the test cart. The reels 29 are located within chamber 10g and their cables 29a extend over pulleys 29b rotatably supported on pivot shafts 20e of workholder 20. The free end of each cable conects to an anchor 29c extending from carriage 21. Each reel is equipped with a spring which tends to draw the cables to elevate carriage 21 to its testing position. The carriage may be restrained in its loading position by a locking plunger 29d which may be received in a locking recess of guide rail 20k as shown in the detail of FIGURE 4.

In order to conduct various final tests on tube 9, it is necessary to apply operating potentials to the electrode system of the tube and to energize the various coils included on carriage 21. Accordingly, a series of electrical connectors are supported on the test cart to one side of vertical frame member 10 as illustrated in FIGURE 5. It is convenient to employ resilient brushes 31 with individual leads 31a. If the brushes contact busses that are maintained at appropriate potentials, then these potentials may be applied through conductors 31a to the several contact strips 22b of socket 22. It is convenient to direct these conductors through a conduit 31b into a test console 32 which accommodates control devices, such as potentiometers, to permit adjusting the amplitudes of the electrode potentials.

In order to energize the coils of carriage 21, chamber 10g houses circuitry for generating signals of appropriate frequency and waveform. It is convenient to include in this circuitry, scanning oscillators for developing the deflection signals and wave-shaping networks energized at the scanning frequencies to develop convergence signals. Such generators and wave-shaping networks are well known in the art. They constitute no part of the present invention and, therefore, have not been illustrated in the drawing. It is not believed necessary to describe their structure or operation. The output signals of the circuitry contained within chamber 10g are delivered as indicated by conduit 31c to console 32 so that the controls thereof may serve as means for adjusting the amplitude of the various deflection and convergence control signals. Moreover, D.C. operating potentials may be applied via brushes 31, connectors 31a and other conductors housed in conduit 31c and extending to the circuits of chamber 10g. Any known cable arrangement may be employed for supplying signal potentials, derived from busses 80 or from the circuitry within chamber 10g and adjusted as to amplitude in console 32, to the electrical systems of carriage 21 so long as they are flexible and permit movement of carriage 21 along guide rods 20k. By way of illustration flexible cables 31d and 31e are shown extending to convergence assembly 24 and purity coil 23, respectively. Similar connections (not shown) are made to socket 22 and to yoke 27.

A separate high voltage connection is provided; it is not made through socket 22. As shown in FIGURE 5, there is a brush 31g to engage a high voltage bus 80 and this brush is associated with a high voltage connector 31h which terminates in a fixture that may conveniently engage the high voltage terminal provided in the funnel portion of the tube envelope. Mechanical support for this high voltage connection is provided by a frame 31f secured to base ring 20d and member 20n of workholder 20.

The adjustments available on console 32 will be described only as to function since structurally they take the well-known form of potential dividers. Focus adjustment 50 varies the D.C. potential applied to the focusing electrodes of the tube under test. Vertical centering control 51a adjusts a component of D.C. in the vertical deflection windings of yoke 27 while horizontal centering control 51b adjusts a D.C. component in the horizontal deflection windings. The next group of 12 controls permit convergence adjustments. The series 52a–d are for red-green horizontal, that is, they are used to converge the red and green horizontal lines; the group 53a to 53d are for red-green vertical and the final group 54a–d are for blue horizontal. The controls with the subscript $a$ affect primarily the top portion of the raster, those with the subscript $b$ affect primarily the bottom of the raster and those with the subscripts $c$ and $d$ control the left and right portions of the raster, respectively. There are D.C. convergence adjustments 55a–c for the red, green and blue guns respectively. Control knob 56a is to adjust D.C. energization for blue lateral magnet 25; 56b is a master brightness control, a common brightness control operating on all three guns concurrently, and 56c designates a video switch. In one position it modulates the picture tube to establish a cross-hatch pattern while in the other it provides a raster of uniform light intensity. Individual brightness controls 57a–c are provided for the red, green and blue guns, respectively. There are vertical and horizontal purity controls 58a and 58b which adjust in amplitude D.C. signals that are applied to purity coil 23. There is a horizontal line switch 59 which may be actuated to cause the scanning pattern to become a horizontal line rather than a raster. Additionally, there is a cathode current control 60 for the red gun with which there is associated the cathode current meter 60a.

In certain tests to be made, it is desirable to modulate the picture tube to develop the so-called cross-hatch pattern of narrow, white lines extending horizontally and vertically across the raster. This is an exceedingly useful pattern for checking the effectiveness of convergence. The video modulation signal source may, likewise, be included within chamber 10g or it may be a centrally located test signal generator coupled over a bus and through a brush 31 to a video frequency amplifier contained within chamber 10g.

The test cart that has been described is for the most part constructed of non magnetic material to avoid adversely affecting the several magnetic fields that are created and employed in final test. This cart is one of a series that are used in the overall final test arrangement to permit the tests to be conducted efficiently and with a minimum of operating personnel. The overall arrangement comprises an endless conveyor 40 shown in plan view in FIGURE 1. The conveyor transports a tube under test from a loading station, through a testing station, to an unloading station. A loading station is at the extreme left and is designated L in FIGURE 1. An unloading station is at the opposite end and is designated U. The intermediate positions are the testing stations and the tubes under test travel in the direction of the arrow. A complete test arrangement is provided by each half of the conveyor and the tubes are transported by the conveyor by means of the test carts. As indicated in FIGURE 5, the mounting pin 10b of each such cart is received in an aperture in a horizontal member 41a of a frame structure 41 which is mechanically secured to the conveyor and serves to hold a single test cart. Frame 41 is secured at its upper end through a coupling block 41b to the conveyor chain 40 and has a roller 41c which rides on a stationary angle iron support 41d which takes most of the weight of the test cart. At its lower end, frame 40 has a similar arrangement of a coupling block 41b, a roller 41c and an angle iron support track 41d. Obviously, the conveyor has two parallel chains 40, 40 as shown in FIGURE 5. The drive motor 41e is coupled to these chains through a gear reduction system 41f and drives them continuously at a speed suitable to the testing program. A travel at the rate of three feet per minute has proven satisfactory.

A cam rail 42 is disposed along the path of the conveyor and is engaged by the cam followers 20p of each test cart to the end that workholder 20 may be moved about its pivot in accordance with the contour of cam rail 42. It is desirable to shape the cam rail so that the tube under test moves from a vertical position which it assumes at the loading station to a horizontal position, simulating the mount of the tube within a color receiver. It is also preferable that the tube be positioned horizontally directly after leaving the loading station so that it has the proper relation to a vertically disposed coil 43 positioned at the leading end of the test stations for establishing a degaussing magnetic field. The coil is supported adjacent the conveyor on a frame 43a and is continuously energized by 60 cycle alternating current and degausses the tube under test as it is transported past the coil by means of the continuous movement of the conveyor.

The test stations beyond degaussing coil 43 are enclosed within a housing 90 because for best results the tube under test is shielded from room light and outside light. Low ambient lighting conditions are desired.

There is a family of busses 80 (FIGURE 5) which extend along the run of the conveyor, commencing immediately after loading station L and continuing through housing 90. The various members of this family are maintained at the operating potentials required by the electrical system of the test cart. Brushes 31 of the cart contact such brushes to energize the test cart continuously through its travel through the various test stations.

In considering the operation of the final test arrangement, reference is made initially to FIGURE 1. Arrow 70 indicates that tubes to be tested are supplied at loading station L. As a matter of practice, they are delivered by a conveyor. It will be assumed initially that the operator at station L has an empty cart at that station that is to be loaded with a tube to be tested. Cap 20f of the cart is opened, that is, turned on its pivot 20g to be free and clear of the opening in workholder 20. Carriage 21 is in its loading position, as shown in FIGURE 3, at the end of guide rails 20k which leaves the workholder 20 free and clear. The operator takes the tube to be tested and places it within workholder 20 with the tube supported from support elements 20a. In inserting the tube, the operator rotates it about its own axis as required to establish the orientation of FIGURE 6 in which index 20c of the workholder mates with index 8 on the periphery of tube 9. When this condition has been attained, the tube has assumed approximately the desired position along the reference axis of the test fixture and also has the appropriate orientation about that axis. Its final position is determined when guide 26 is moved to its elevated position. Cap 20f is now closed and locked by means of latch 20r. Closing the cap brings the spring loaded clamps 20j to bear against the cap of the tube so that it is held firmly in position throughout its travel from the loading to the unloading stations of the conveyor.

The high voltage connector 31h is now engaged with the high voltage terminal of the tube envelope and latch 29d is released so that carriage 21 may be moved vertically upward from its loading to its testing position. This position is determined by the engagement of liner gauge 26 with the funnel of the tube under test which establishes the appropriate distance for the convergence magnets relative to the electrode system of tube 9. Handle 25a is now rotated in a counterclockwise direction, as viewed in FIGURE 8, permitting convergence magnets 24a to move inwardly against the neck of the tube. Concurrently, blue lateral magnet 25 moves into position. Crank 28 is operated, if necessary, to have yoke 27 assume its lowermost position, that is, the position indicated in FIGURE 7. In this position, the deflection fields have their least effect on the beams whereas in the other extreme position of the yoke assembly, these fields have their maximum effect. It is appropriate to manipulate socket ring 22a to make certain that good connections are made between contact springs 22b and the several pins of the tube under test. At this juncture, the test cart is electrically inert, that is to say, no potentials have been supplied to it for the reason that the various brushes 31 are not in contact with the supply busses 80 from which the cart is to be energized.

The speed of the conveyor, while continuous, is relatively slow and provides ample time for the operator to load the tube under test and adjust the test cart as described preparatory to conducting the several test operations. As the cart conveying the tube travels in the direction of the arrow of FIGURE 1 and leaves loading station L, brushes 31 are brought to the start of busses or power rails 80 through which the necessary D.C. potentials are provided through socket 22 to the electrode system of the tube, and through high voltage connector 31h to the final anodes of the three guns within the tube. At the same time, a 60 cycle A.C. supply is furnished to the cart. With these voltages applied, the filaments of the three guns of the tube are brought to operating temperature and the tube is prepared for final test before it enters the test booth. The electrical systems of the test cart remain thus energized as the cart travels through housing 90.

Directly after the cart has cleared the loading station, cam rail 42 in conjunction with followers 20p of the cart rotate workholder 20 about its pivot to position tube 9 in a horizontal plane with its screen facing away from the conveyor. This displacement of the tube does not interfere with the energization or operation of the electrical systems of the test cart. As a precautionary measure, a switch operator 91 is mounted in the path of travel of the test carts at such a height that the cart may pass under the actuator if cap 20f has been properly closed. On the other hand, should the operator fail to close the cap, it would displace switch actuator 91 and cause the drive of the conveyor to be shut down.

At the leading edge of the testing stations when the tube shall have assumed its horizontal position, it is carried past degaussing coil 43 and is degaussed. Thereafter, the tube enters housing 90. One test procedure that has been employed includes the following steps:

Center the raster with horizontal and vertical centering controls 51a, 51b.

Turn on the red color by brightness control 57a and adjust the red center with horizontal and vertical purity controls 58a, 58b.

Check the focus on all three colors by focus control 50.

Turn on green and blue colors via controls 57b and 57c.

Merge red, green and blue lines in center of raster until crosshatch pattern appears white by controls 55a–c and 56a.

Turn off blue and green and switch via control 56c to plain red raster.

By operation of crank 28e, advance yoke 27 to its maximum position and then by reversing the rotation of the crank, move the yoke assembly back until an optimum red raster is attained.

Turn on the cross-hatch pattern by operation of switch 56c and turn on the blue and green colors by controls 57b and c.

Merge the red, blue and green lines in the center of the raster until the cross-hatch pattern turns white by using controls 55a–c and blue lateral control 56a.

Merge the red and green horizontal and vertical lines at the bottom of the pattern using controls 52d and 53b.

Merge the red and green horizontal and vertical lines at the top of the pattern using controls 52a and 53a.

Merge the blue horizontal lines with red and green lines at the bottom of the pattern using control 54b.

Merge the blue horizontal lines with red and green lines at the top pattern using control 54a.

Merge the red and green horizontal lines at the right center of the pattern using control 52d.

Merge the red and green vertical lines at right center of the pattern using control 53d.

Merge the blue horizontal line with the red and green lines at the right center of the pattern using control 54d.

Merge the red and green horizontal lines at the left center with control 52c.

Merge the red and green vertical lines at the left center by adjustment 53c.

Merge the blue horizontal line with red and green lines at the left side of the pattern with control 54c.

In following the aforesaid procedures, the operator will be able to evaluate purity and convergence of the tube. If they are adequate, the light output is measured as follows:

By control 60 the beam current for the red gun is set to 400 microamperes as registered on meter 60a.

Adjust the console to establish the best purity on the red screen and best focus.

Place a light cell directly in the center of the screen and observe the reading.

The measured output then indicates whether or not the tube under test has an acceptable output.

The cut-off characteristics of the tube may be checked by adjusting switch 59 to establish a horizontal line on the screen. The bias control knob 57a for the red gun is adjusted until the line just disappears, and the grid voltage is read on a meter (not shown) which may be included in the console control panel.

This step is repeated for both the green and the blue guns.

It is then appropriate to establish a white field and examine the screen for obvious defects. This step is then repeated for the red, green and blue fields.

Having completed the series of tests, the operator labels the tube acceptable or rejected. If rejected, a code number is used to designate the shortcoming of the tube. Thereafter, the tube passes out of test booth 90 and cam rail 42 restores it to its vertical position. At unloading station U, the test cart is returned to its loading condition, that is to say, cap 20f is opened and the electrical services will have been disconnected because the brushes 31 will have passed beyond the run of busses 80. Handle 25 is moved to its extreme counterclockwise position to shift convergence magnets 24a away from the tube and carriage 21 is lowered and locked to its loading position. The tube is now removed from the test cart and sent on its way as indicated by arrow 71. This same test procedure is followed in respect of tubes that traverse the other side of the conveyor between 70a as a loading station and 71a as an unloading station.

It has been found that this test arrangement permits the final tests to be conducted on color tubes in an environment closely approaching that of the tube when operatively connected into a color television receiver. The tests may be conducted with dispatch and six persons may operate the entire arrangement, testing approximately 120 tubes per hour.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A final test arrangement for a color cathode-ray tube having an envelope with a neck portion and a screen portion and enclosing an electrode system, said arrangement comprising:

a conveyor for transporting a tube under test from a loading station, through a testing station to an unloading station;

a cam rail disposed along the path of said conveyor;

a plurality of test carts coupled to said conveyor to travel therewith, each of said carts including:

a pivotally mounted workholder for supporting a tube under test in a predetermined position along, and in a predetermined rotational relation with respect to, a reference axis;

electrical connectors for applying operating potentials to said electrode system of the tube under test;

a convergence assembly disposed to encompass said neck portion of the tube under test;

a yoke assembly also disposed to encompass said neck portion of the tube under test on the screen side of said convergence assembly;

means for applying convergence and deflection signals of adjustable amplitude to said convergence and yoke assemblies respectively;

means for positionally adjusting said yoke assembly relative to said convergence assembly along said reference axis;

and a cam follower mechanically coupled to said workholder and in engagement with said cam rail, said rail being contoured to displace said workholder about its pivot so that the tube under test assumes, while in said testing station, a position corresponding to that of the tube within a color receiver.

2. A final test arrangement for a color cathode-ray tube having an envelope with a neck portion and a screen portion and enclosing an electrode system, said arrangement comprising:
- a conveyor for transporting a tube under test from a loading station, through a testing station to an unloading station;
- means, positioned at the leading end of said testing station, for establishing a degaussing magnetic field;
- a cam rail disposed along the path of said conveyor;
- a plurality of test carts coupled to said conveyor to travel therewith, each of said carts including:
  - a pivotally mounted workholder for supporting a tube under test in a predetermined position along, and in a predetermined rotational relation with respect to, a reference axis;
  - electrical connectors for applying operating potentials to said electrode system of the tube under test;
  - a convergence assembly disposed to encompass said neck portion of the tube under test;
  - a yoke assembly also disposed to encompass said neck portion of the tube under test on the screen side of said convergence assembly;
  - means for applying convergence and deflection signals of adjustable amplitude to said convergence and yoke assemblies respectively;
  - means for positionally adjusting said yoke assembly relative to said convergence assembly along said reference axis;
  - and a cam follower mechanically coupled to said workholder and in engagement with said cam rail, said rail being contoured to displace said workholder about its pivot so that the tube under test assumes, while in said testing station, a position corresponding to that of the tube within a color receiver.

3. A final test arrangement for a color cathode-ray tube having an envelope with a neck portion and a screen portion and enclosing an electrode system, said arrangement comprising:
- a conveyor for transporting a tube under test from a loading station, through a testing station to an unloading station;
- a vertically disposed coil positioned at the leading end of said testing station and continuously energized by an A.C. potential for establishing a degaussing magnetic field;
- a cam rail disposed along the path of said conveyor;
- a plurality of test carts coupled to said conveyor to travel therewith, each of said carts including:
  - a pivotally mounted workholder for supporting a tube under test in a predetermined position along, and in a predetermined rotational relation with respect to, a reference axis;
  - electrical connectors for applying operating potentials to said electrode system of the tube under test;
  - a convergence assembly disposed to encompass said neck portion of the tube under test;
  - a yoke assembly also disposed to encompass said neck portion of the tube under test on the screen side of said convergence assembly;
  - means for applying convergence and deflection signals of adjustable amplitude to said convergence and yoke assemblies respectively;
  - means for positionally adjusting said yoke assembly relative to said convergence assembly along said reference axis;
  - and a cam follower mechanically coupled to said workholder and in engagement with said cam rail, said rail being contoured to displace said workholder about its pivot so that the tube under test assumes, while in said testing station, a generally horizontal position corresponding to that of the tube within a color receiver.

4. A final test arrangement for a color cathode-ray tube having an envelope with a neck portion, a screen portion and an index portion and enclosing an electrode system, said arrangement comprising a test cart which includes:
- a workholder normally disposed in a vertical position to receive a tube to be tested and pivotable to a substantially horizontal position to present a tube supported therein in a predetermined position along a reference axis;
- a cap movably secured to said workholder to close over said screen portion and lock the tube under test in its aforesaid predetermined position, said cap having a centrally located aperture for exposing said screen portion of the tube under test;
- an index device included in said workholder for engaging said index portion of said envelope to establish the tube under test in a predetermined rotational relation with respect to said reference axis;
- electrical connectors for applying operating potentials to said electrode system of the tube under test;
- a convergence assembly dimensioned to encompass said neck portion of the tube under test;
- a yoke assembly also dimensioned to encompass said neck portion of the tube under test on the screen side of said convergence assembly;
- means for applying convergence and deflection signals of adjustable amplitude to said convergence and yoke assemblies respectively, means for concurrently moving said convergence and yoke assemblies from a loading position in which said assemblies are substantially clear of a tube in said workholder to a test position in which said assemblies encompass said neck portion of a tube in said workholder;
- and means for positionally adjusting said yoke assembly relative to said convergence assembly along said reference axis while said assemblies are in said test position.

5. A final test arrangement for a color cathode-ray tube having an envelope with a neck portion, a screen portion and an index portion and enclosing an electrode system, said arrangement comprising a test cart which includes:
- a workholder normally disposed in a vertical position to receive a tube to be tested and pivotable to a substantially horizontal position to present a tube supported therein in a predetermined position along a reference axis;
- a cap movably secured to said workholder to close over said screen portion and lock the tube under test in its aforesaid predetermined position, said cap having a centrally located aperture for exposing said screen portion of the tube under test, said cap also having a flange portion extending in the direction of said reference axis and at least the internal surface thereof being of a magnetic shielding material;
- an index device included in said workholder for engaging said index portion of said envelope to establish the tube under test in a predetermined rotational relation with respect to said reference axis;
- electrical connectors for applying operating potentials to said electrode system of the tube under test;
- a convergence assembly dimensioned to encompass said neck portion of the tube under test;
- a yoke assembly also dimensioned to encompass said neck portion of the tube under test on the screen side of said convergence assembly;
- means for applying convergence and deflection signals of adjustable amplitude to said convergence and yoke assemblies respectively, means for concurrently moving said convergence and yoke assemblies from a loading position in which said assemblies are substantially clear of a tube in said workholder to a test position in which said assemblies encompass said neck portion of a tube in said workholder;
- and means for positionally adjusting said yoke assembly relative to said convergence assembly along said reference axis while said assemblies are in said test position.

6. A final test arrangement for a color cathode-ray tube having an envelope with a neck portion, a screen portion, a base portion and enclosing an electrode system, said arrangement comprising a test cart which includes:
- a workholder normally disposed in a vertical position to receive a tube to be tested and pivotable to a substantially horizontal position to present a tube supported therein a predetermined position along and in a predetermined rotational relation with respect to a reference axis;
- a carriage slidably supported on said workholder;
- a yoke assembly, a convergence assembly and an electrical socket mounted coaxially with said reference axis and in the recited order on said carriage;
- means for moving said carriage from a loading position in which the assemblies mounted thereon are clear of the tube under test to a testing position in which said yoke and convergence assemblies encompass said electrode system of the tube under test and said socket engages said base of said tube;
- said yoke assembly being movable relative to said carriage and along said reference axis;
- means for applying convergence and deflection signals of adjustable amplitude to said convergence and yoke assemblies respectively;
- and means for positionally adjusting said yoke assembly while said assemblies are in said testing position.

7. A final test arrangement for a color cathode-ray tube having an envelope with a neck portion, a screen portion, and a base portion and enclosing an electrode system, said arrangement comprising a test cart which includes:
- a workholder for supporting a tube under test in a predetermined position along and in a predetermined rotational relation with respect to a reference axis;
- a carriage slidably supported on said workholder;
- a yoke assembly, a convergence assembly and an electrical socket mounted coaxially with said reference axis and in the recited order on said carriage;
- means for moving said carriage from a loading position in which the assemblies mounted thereon are clear of the tube under test to a testing position in which said yoke and convergence assemblies encompass said electrode system of the tube under test and said socket engages said base of said tube;
- a cylindrical gauge mounted concentrically within said yoke and convergence assemblies and extending coaxially beyond said yoke assembly for engaging said envelope of the tube under test to determine the location of said testing position of said carriage along said reference axis;
- means for applying convergence and deflection signals of adjustable amplitude to said convergence and yoke assemblies respectively;
- said yoke assembly being movable relative to said carriage and along said reference axis;
- and means for positionally adjusting said yoke assembly while said assemblies are in said testing position.

8. A final test arrangement for a color cathode-ray tube having an envelope with a neck portion and a screen portion, and enclosing an electrode system, said arrangement comprising a test cart which includes:
- a workholder for supporting a tube under test in a predetermined position along and in a predetermined rotational relation with respect to a reference axis;
- a carriage slidably supported on said workholder;
- a yoke assembly and a convergence assembly mounted coaxially with said reference axis and in the recited order on said carriage;
- said carriage being movable from a loading position in which the assemblies mounted thereof are clear of the tube under test to a testing position in which said yoke and convergence assemblies encompass said electrode system of the tube under test;
- means for applying convergence and deflection signals of adjustable amplitude to said convergence and yoke assemblies respectively;
- said yoke assembly being movable relative to said carriage and along said reference axis;
- means for positionally adjusting said yoke assembly;
- said convergence assembly including a plurality of convergence magnets movable radially from a loading position in which said magnets are widely spaced from said neck portion of the tube under test to a testing position in which said magnets are closely adjacent said neck portion of said tube;
- and means supported on said carriage and movable relative to said magnets for displacing said magnets from said loading to said testing position.

9. A final test arrangement for a color cathode-ray tube having an envelope with a neck portion and a screen portion and enclosing an electrode system, said arrangement comprising a test cart which includes:
- a workholder for supporting a tube under test in a predetermined position along and in a predetermined rotational relation with respect to a reference axis;
- a carriage slidably supported on said workholder;
- a yoke assembly and a convergence assembly mounted coaxially with said reference axis and in the recited order on said carriage;
- said carriage being movable from a loading position in which the assemblies mounted thereon are clear of the tube under test to a testing position in which said yoke and convergence assemblies encompass said electrode system of the tube under test;
- means for applying convergence and deflection signals of adjustable amplitude to said convergence and yoke assemblies respectively;
- said yoke assembly being movable relative to said carriage and along said reference axis;
- means for positionally adjusting said yoke assembly;
- said convergence assembly including a plurality of convergence magnets movable radially from a loading position in which said magnets are widely spaced from said neck portion of the tube under test to a testing position in which said magnets are closely adjacent said neck portion of said tube;
- means supported on said carriage and movable relative to said magnets for displacing said magnets from said loading to said testing positions;
- and a blue lateral magnet mechanically coupled to and movable with one of said convergence magnets between a loading and a testing position.

10. A final test arrangement for a color cathode-ray tube having an envelope with a neck portion, a screen portion, a base portion and an index portion and enclosing an electrode system, said arrangement comprising a test cart which includes:
- a workholder for supporting a tube under test in a predetermined position along a reference axis;
- an index device included in said workholder for engaging said index portion of said envelope to establish the tube under test in a predetermined rotational relation with respect to said reference axis;
- a carriage slidably supported on said workholder;
- a yoke assembly, a convergence assembly, a purity coil and an electrical socket mounted coaxially with said reference axis and in the recited order on said carriage;
- said carriage being movable from a loading position in which the assemblies mounted thereon are clear of the tube under test to a testing position in which said convergence assembly encompasses said electrode system of the tube under test and said socket engages said base of said tube;
- means for applying convergence and deflection signals of adjustable amplitude to said convergence and yoke assemblies respectively;
- means for controllably energizing said purity coil;

said yoke assembly being movable relative to said carriage and along said reference axis;

means for positionally adjusting said yoke assembly;

said convergence assembly including a plurality of convergence magnets movable radially from a loading position in which said magnets are widely spaced from said neck portion of the tube under test to a testing position in which said magnets are closely adjacent said neck portion of said tube;

and means for displacing said magnets from loading to said testing positions.

11. A final test arrangement for a color cathode-ray tube having an envelope with a neck portion and a screen portion and enclosing an electrode system, said arrangement comprising a test cart which includes:

a workholder for supporting a tube under test in a predetermined position along and in a predetermined rotational relation with respect to a reference axis;

a carriage slidably supported on said workholder;

a yoke assembly and a convergence assembly mounted coaxially with said reference axis in the recited order on said carriage;

said carriage being movable from a loading position in which the assemblies mounted thereon are clear of the tube under test to a testing position in which said yoke and convergence assemblies encompass said electrode system of the tube under test;

means for applying convergence and deflection signals of adjustable amplitude to said convergence and yoke assemblies respectively;

said yoke assembly being movable relative to said carriage and along said reference axis;

means for positionally adjusting said yoke assembly;

said convergence assembly including a plurality of convergence magnets, a plurality of support arrangements for said magnets individually comprising a radially extending member carrying a magnet at its inner end and carrying a cam follower at its opposite end;

a cam assembly having a corresponding plurality of sections, one for each of said radial members and contoured to move said magnets radially from a loading position in which said magnets are widely spaced from said neck portion of the tube under test to a testing position in which said magnets are closely adjacent said neck portion of said tube;

and means for rotationally shifting said cam assembly to displace said magnets between said loading and said testing positions.

References Cited

UNITED STATES PATENTS

| | | | |
|---|---|---|---|
| 2,780,803 | 2/1957 | Andrews | 178—7.8 |
| 3,139,485 | 6/1964 | Gray | 178—7.8 |

FOREIGN PATENTS

| | | |
|---|---|---|
| 1,136,023 | 9/1962 | Germany. |

RUDOLPH V. ROLINEC, *Primary Examiner.*

E. L. STOLARUN, *Assistant Examiner.*